United States Patent [19]
Zeilinger

[11] Patent Number: 6,039,654
[45] Date of Patent: Mar. 21, 2000

[54] SWING SET BRACKET

[75] Inventor: Brian K. Zeilinger, Janesville, Wis.

[73] Assignee: PlayStar, Incorporated, Janesville, Wis.

[21] Appl. No.: 09/289,042

[22] Filed: Apr. 9, 1999

[51] Int. Cl.$^7$ ................................................ A63G 9/00
[52] U.S. Cl. ........................... 472/118; 403/403; 248/165
[58] Field of Search .................... 472/118, 119, 472/120, 121, 122, 123, 124, 125; 403/403, 232.1; 248/370, 165, 163.1, 163.2

[56] References Cited

U.S. PATENT DOCUMENTS

| | | | |
|---|---|---|---|
| D. 160,320 | 10/1950 | Horowitz | D34/5 |
| D. 174,847 | 5/1955 | Ahrens | D34/5 |
| D. 244,704 | 6/1977 | Smyrni et al. | D34/5 |
| 262,032 | 8/1882 | Ferguson | 403/403 |
| D. 286,423 | 10/1986 | Saxman et al. | D21/244 |
| 1,729,529 | 9/1929 | Whitman . | |
| 2,151,403 | 3/1939 | Burke | 272/57 |
| 2,517,207 | 8/1950 | Hugueny | 155/62 |
| 3,145,013 | 8/1964 | Grudoski | 248/370 |
| 3,503,582 | 3/1970 | Boucher | 248/370 |
| 3,704,849 | 12/1972 | Green | 248/165 |
| 3,825,254 | 7/1974 | McGuire | 272/85 |
| 4,094,503 | 6/1978 | Wormser | 272/85 |
| 4,190,283 | 2/1980 | Boucher | 297/77 |
| 4,256,300 | 3/1981 | Boucher | 272/85 |
| 4,966,309 | 10/1990 | Baer | 272/85 |
| 5,016,873 | 5/1991 | Bosa | 272/85 |
| 5,240,342 | 8/1993 | Kresa, Jr. | 403/232.1 |
| 5,364,312 | 11/1994 | Cunard et al. | 472/118 |
| 5,380,116 | 1/1995 | Colonias | 403/232.1 |

OTHER PUBLICATIONS

The Amazing Imagination Machines, Dallas Custom Swings, Creative Playthings, Backyard Playset Collection Playkids Playgrounds, Playkids Manufacturing Inc. Miami, Florida (1996).

*Primary Examiner*—Kien T. Nguyen
*Attorney, Agent, or Firm*—Michael Best & Friedrich LLP

[57] ABSTRACT

The invention provides a playstation that is configured to be stronger, less expensive to manufacture, and easier to assemble. The playstation includes a Y-shaped support that has a top section, a lower left section and a lower right section. The playstation also includes a cross-beam having a first cross-beam secured to the left side of the top section on the Y-shaped support and a second cross-beam secured to the right side of the top section on the Y-shaped support. The playstation further includes a left leg secured to the lower left section of the Y-shaped support and a right leg secured to the lower right section of the Y-shaped support. Using the Y-shaped support of the present invention allows the playstation to be readily assembled. The assembled playstation also provides a solid support structure for securing one or more children's accessories to the playstation.

15 Claims, 5 Drawing Sheets

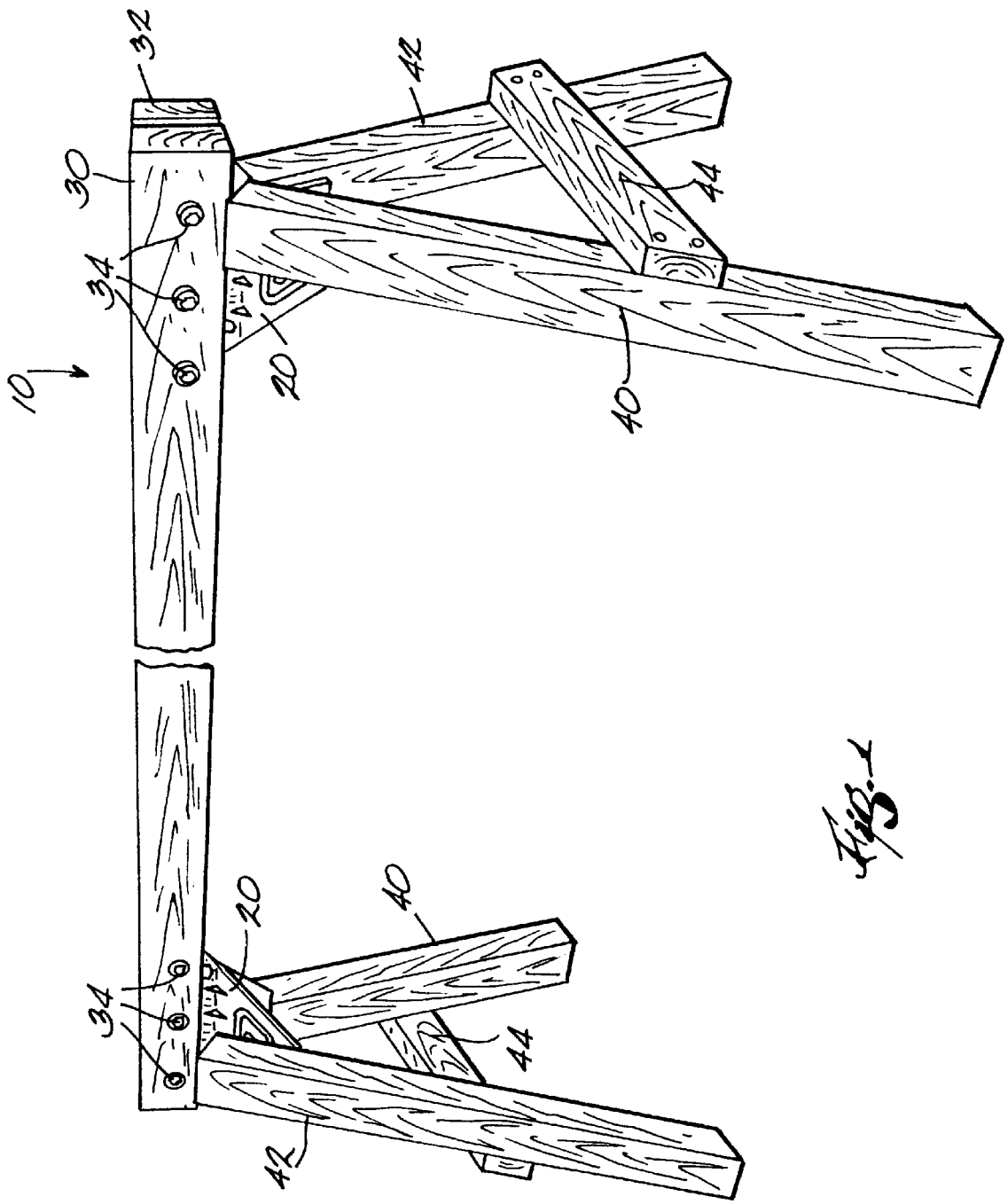

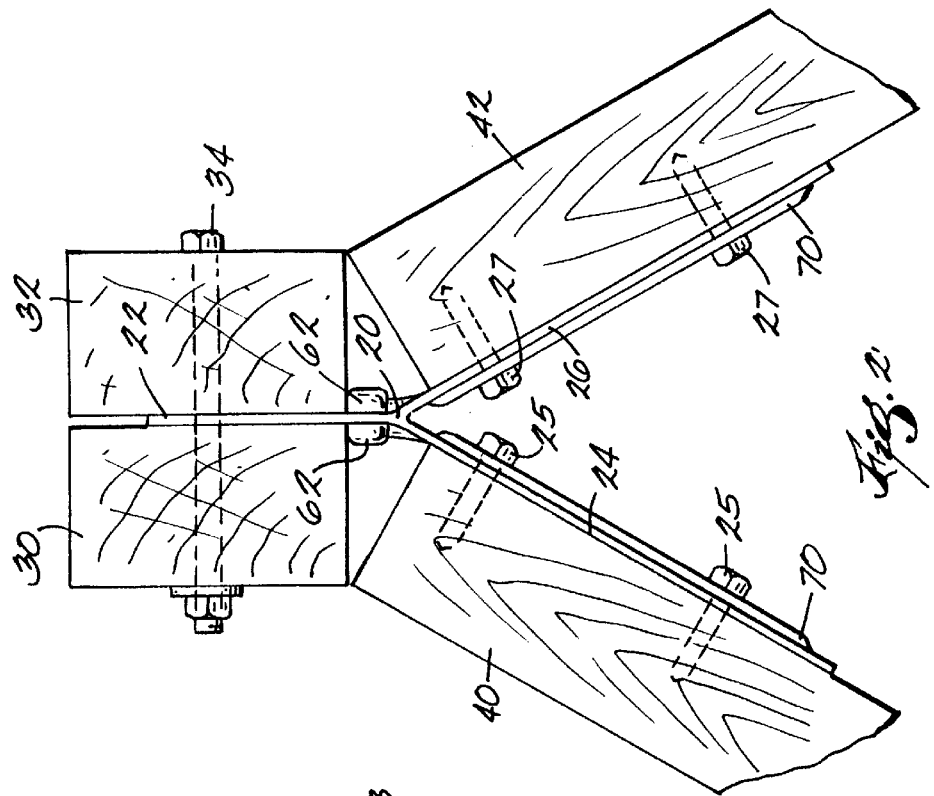
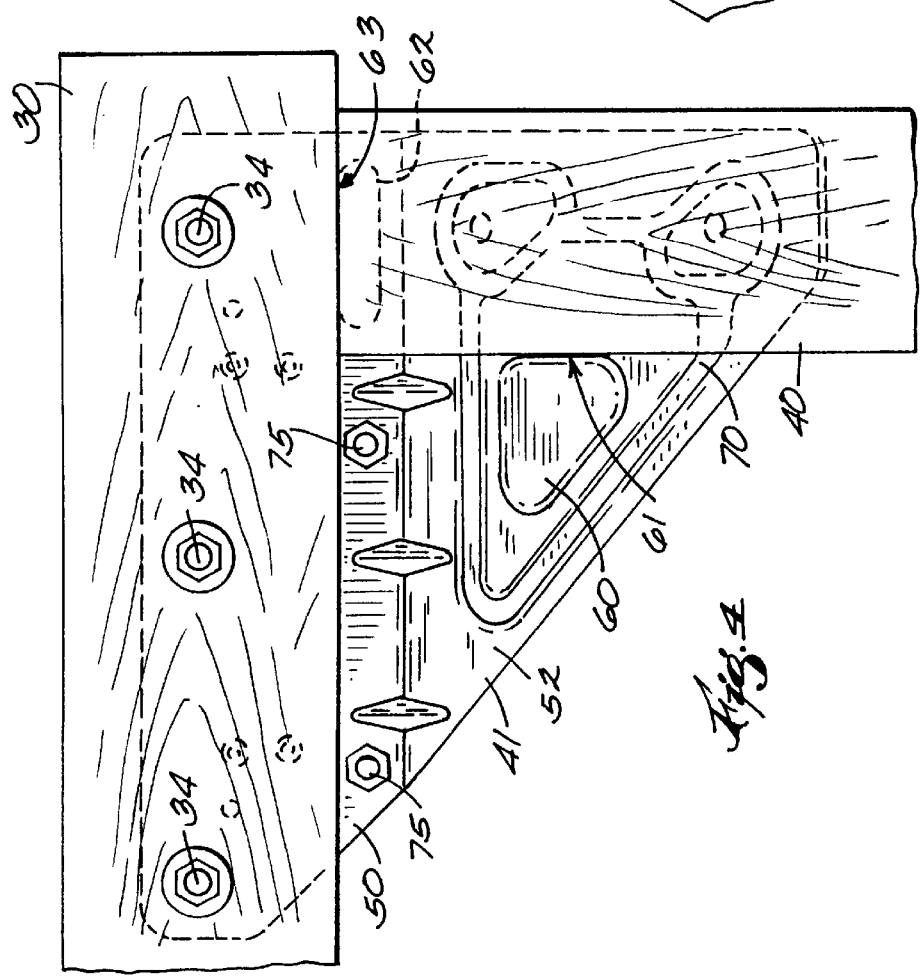

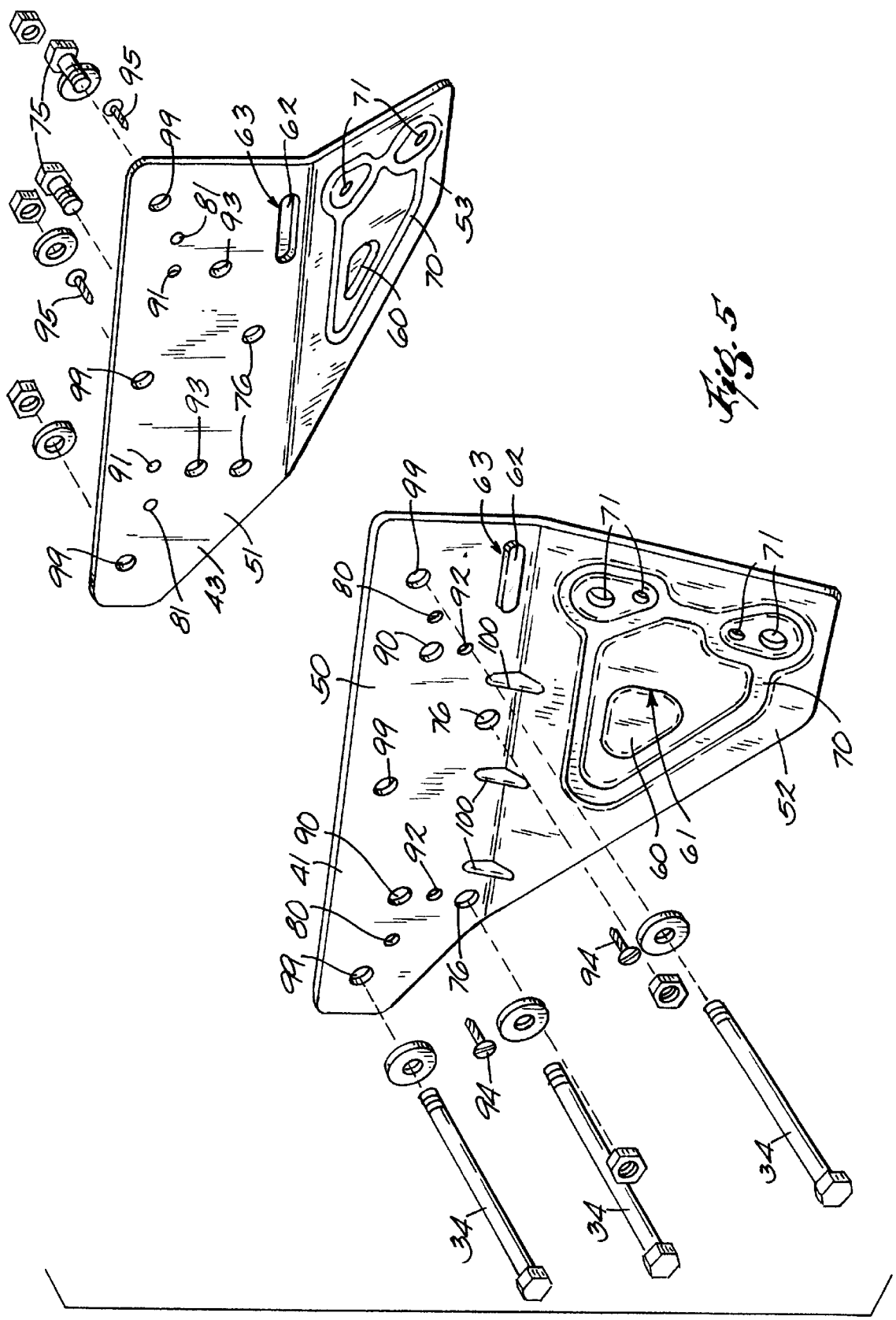

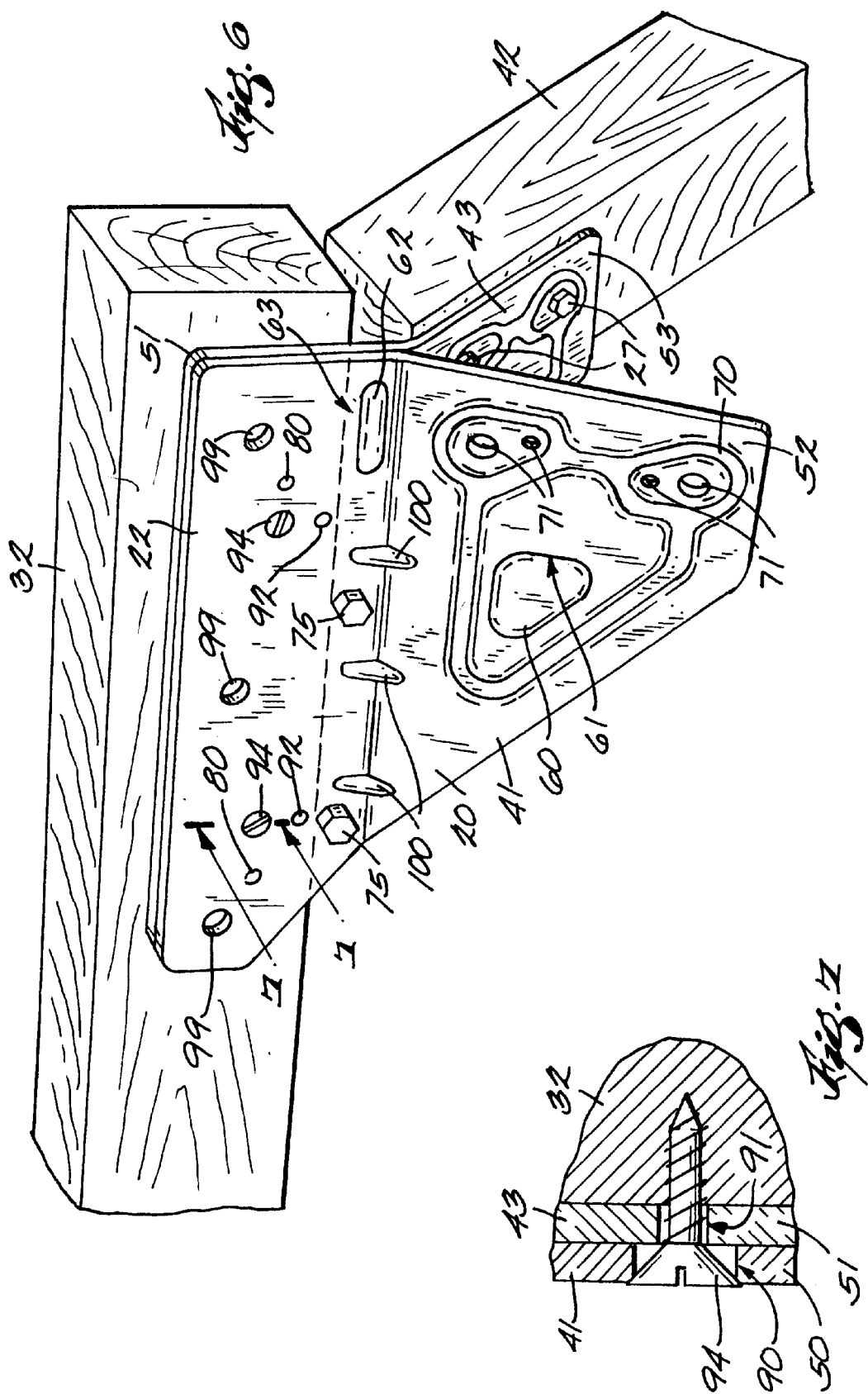

6,039,654

SWING SET BRACKET

BACKGROUND OF THE INVENTION

The present invention relates to a playstation, and particularly, to a playstation that is configured to be stronger, less expensive to manufacture, and easier to assemble.

Playstations are typically used as a framework onto which various children's play accessories (e.g., swings, slides, climbing towers, etc.) are secured. The children's accessories are attached to the playstations in any number of configurations.

Playstations are commonly sold to consumers as a conglomeration of unassembled parts in order to facilitate shipping and handling of the playstation. As a result, the playstation is assembled by the ultimate user at the desired location. The number, size, and complexity of the parts makes assembling conventional playstations extremely cumbersome.

Typical playstations include one or more horizontal cross-beams that are supported by one or more support structures. The cross-beams are usually either metal (e.g., tubular metal) or wood (e.g., a single 4×4 beam or 2 parallel 2×6 timbers). The support structures include one or more brackets fastened to supports, or legs (commonly in an A-frame configuration).

One of the problems associated with conventional brackets is that they have elaborate configurations making them costly to manufacture. Another problem with conventional brackets is that the elaborate configurations add to the difficulty associated with assembling the playstations. Several conventional brackets are disclosed in U.S. Pat. Nos. 4,190,283 and 5,364,312.

SUMMARY OF THE INVENTION

Accordingly, the invention provides a playstation that is configured to be stronger, less expensive to manufacture, and easier to assemble. The playstation includes a Y-shaped support that has a top section, a lower left section, and a lower right section. The playstation also includes a first cross-beam secured to the left side of the top section on the Y-shaped support and a second cross-beam secured to the right side of the top section on the Y-shaped support. The playstation further includes a left leg secured to the lower left section of the Y-shaped support and a right leg secured to the lower right section of the Y-shaped support.

Using the Y-shaped support of the present invention allows the playstation to be readily assembled. The assembled playstation also provides a solid support structure for securing one or more children's accessories to the playstation.

The Y-shaped support is preferably secured to one end of the first and second cross-beams while a support structure (which could include another Y-shaped support) is secured to the opposite end of the cross-beams, although the Y-shaped support could be secured to any point along either cross-beam.

The Y-shaped support is preferably assembled from a left bracket and a right bracket where each of the brackets includes an upper portion and a lower portion. The upper portions of the left and right brackets are secured together to form the top section of the Y-shaped support such that the lower portion of the left bracket becomes the lower left section of the Y-shaped support and the lower portion of the right bracket becomes the lower right section of the Y-shaped support. A plurality of conventional fasteners connect the upper portions of the brackets together, although the brackets can be connected together by a single fastener.

The left and right brackets preferably include one or more pairs of axially aligned openings where one of the openings is larger than the other opening. Fasteners extends through each pair of openings in order to secure the bracket that has the smaller opening to one of the cross-beams. The heads of the fasteners fit within the larger openings of the other bracket. Recessing the heads of the fasteners within the larger openings in the other bracket allows the unsecured cross-beam to be placed flush against the other bracket. Once properly positioned against the other bracket, the unsecured cross-beam is connected to the already secured cross-beam by the use of fasteners or some other means commonly known in the art.

In another form of the invention, the first and second cross-beams are positioned against the top section of the Y-shaped support such that the first and second cross-beams are substantially parallel. The first and second cross-beams are aligned relative to one another and the Y-shaped support by positioning the cross-beams against the fasteners that are used to secure the left and right brackets of the Y-shaped support together.

In yet another form of the invention, the Y-shaped support includes one or more embosses that protrude from the surface of the Y-shaped support. The embosses are positioned to provide alignment for mounting the cross-beams and/or the legs to the Y-shaped support by providing a surface that abuts the leg and/or crossbeam when either of these articles is mounted to the Y-shaped support.

A principal advantage of the invention is to provide a playstation that is easily assembled.

Another advantage of the invention is to provide a playstation that includes parts which are easy to fabricate.

Another advantage of the invention is to provide a playstation that is sturdy enough to act as a support structure for one or more children's play accessories.

Other features and advantages of the invention are set forth in the following drawings, detail description and claims.

BRIEF DESCRIPTION OF THE DRAWINGS

FIG. 1 is a perspective view of a playstation of the present invention.

FIG. 2 is an end view of one form of the Y-shaped support that is used in the playstation of the present invention.

FIG. 4 is an enlarged plan view of an upper section of the playstation of FIG. 1.

FIG. 5 is a perspective view of a preferred form of a left and right bracket that could be used to form the Y-shaped support.

FIG. 6 is a perspective view of a portion of a partially assembled playstation.

FIG. 7 is a section view of a portion of the partially assembled playstation of FIG. 6 taken along line 7—7.

Figure 3:
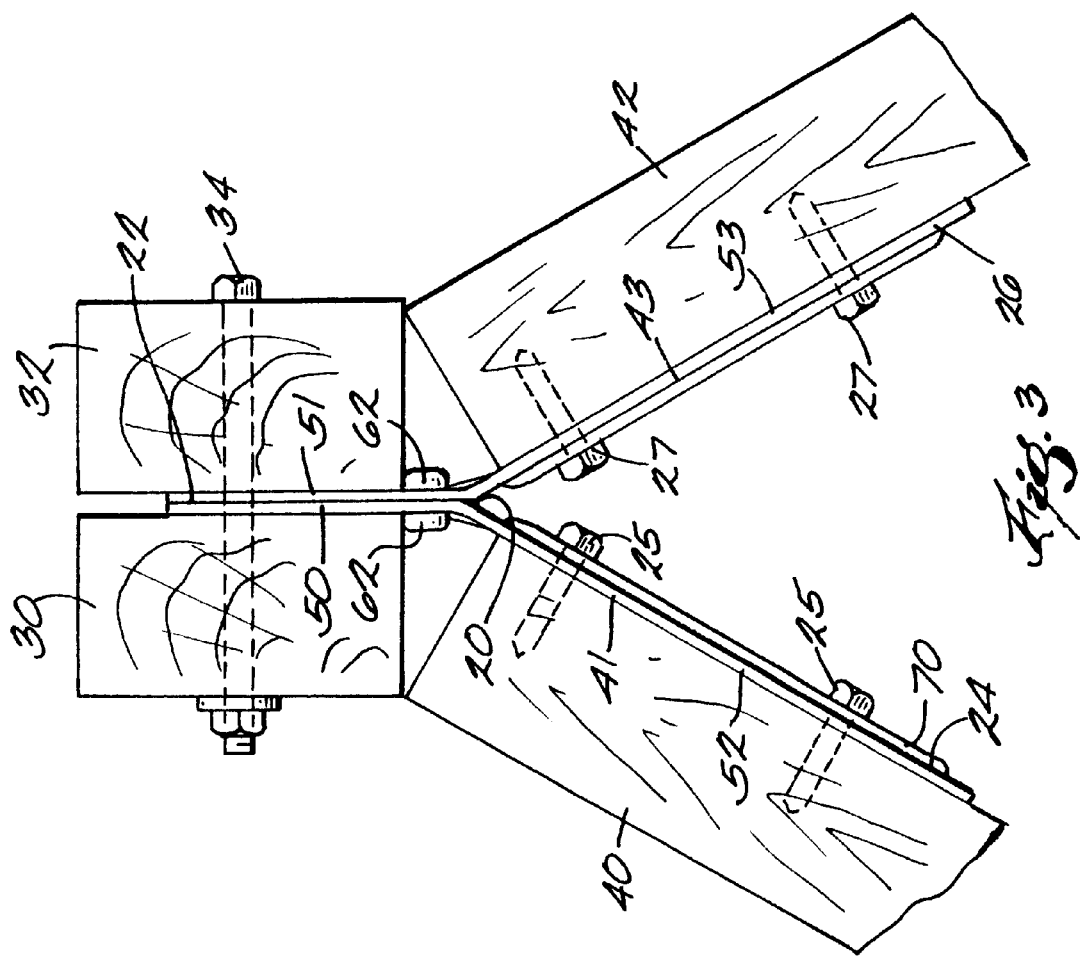
FIG. 3 is an enlarged end view of the top of the playstation of FIG. 1.

The foregoing description of the present invention has been presented for purposes of illustration and description. The description is not intended to limit the invention to the form disclosed herein. Consequently, variations and modifications commensurate with the above teachings, and the skill or knowledge of the prior art, are within the scope of the present invention. The embodiments described herein are intended to explain the best modes for practicing the invention and to enable others skilled in the art to utilize the invention and the disclosed or other embodiments, and with various modifications required by the particular applications or uses of the present invention. It is intended that the appended claims be construed to include alternative embodiments to the extent permitted by the prior art.

DETAILED DESCRIPTION OF THE PREFERRED EMBODIMENTS

A playstation 10 of the present invention is shown in FIG. 1. The playstation 10 includes a Y-shaped support 20 secured between a first cross-beam 30 and a second cross-beam 32. The first cross-beam 30 and the second cross-beam 32 are secured together using fasteners 34. The playstation 10 further includes left legs 40 and right legs 42 that are connected to respective Y-shaped supports 20. The embodiment illustrated in FIG. 1 includes center supports 44 extending between the left legs 40 and the right legs 42 to provide further support to the playstation 10. While in FIG. 1, Y-shaped support 20 is mounted on each end of the first cross-beam 30 and the second crossbeam 32, it should be understood that a single Y-shaped support 20 can be mounted anywhere along the length of the first cross-beam 30 or the second cross-beam 32. In such a situation (not shown), the free end of the cross-beam is connected to other suitable support structures).

One form of the Y-shaped support 20 that is used in the playstation 10 is shown in FIG. 2. The Y-shaped support 20 includes a top section 22, a lower left section 24 and a lower right section 26. The first cross-beam 30 is positioned against one side of the top section 22 and the second cross-beam 32 is positioned against the opposite side of the top section 22. The left leg 40 is secured to the lower left section 24 using fasteners 25 and the right leg 42 is secured to the lower right section 26 using fasteners 27.

FIGS. 3–6 illustrates another form of the Y-shaped support 20 wherein the Y-shaped support 20 includes a left bracket 41 and a right bracket 43. The left bracket 41 includes an upper portion 50 and a lower portion 52, while the right bracket 43 includes an upper portion 51 and a lower portion 53. The upper portion 50 of the left bracket 41 is secured to the upper portion 51 of the right bracket 43 to form the top section 22 of the Y-shaped support 20 (See FIG. 3). Except where noted specifically below, the left bracket 41 and the right bracket 43 are mirror images of one another, and accordingly, only the left bracket 41 will be described in detail.

As shown most clearly in FIGS. 4 and 5, the left bracket 41 includes an emboss 60 that serves to align the left leg 40 of the playstation 10 during assembly. The emboss 60 includes an abutment surface 61 that is positioned against the left leg 40 when the left leg 40 is assembled to the left bracket 41.

The left bracket 41 also includes an emboss 62 located on the upper portion 50 (see FIG. 4). The emboss 62 serves to align the first cross-beam 30 of the playstation 10 during assembly. The emboss 62 includes an abutment surface 63 that is positioned against the first cross-beam 30 when the first crossbeam 30 is assembled to either the Y-shaped support 20 or the second cross-beam 32.

The left bracket 41 also includes an emboss pattern 70 that extends up from the inner surface of the lower portion 52. The emboss pattern 70 includes openings 71 therein such that the fasteners 25 extend through the openings 71 into the left leg 40 in order to secure the lower portion 52 to the left leg 40.

The upper portion 50 of the left bracket 41 and the upper portion 51 of the right bracket 43 are fastened together by extending fasteners 75 through identically matching openings 76 in the left bracket 41 and the right bracket 43. Once the left bracket 41 and the right bracket 43 are secured together, the fasteners 75 serve as an abutment surface for the first cross-beam 30 and/or the second cross-beam 32 when they are assembled as part of the playstation 10 (see FIG. 4).

The left bracket 41 also includes webs 100 extending between the upper portion 50 and the lower portion 52 (see FIGS. 4–6). The webs 100 are designed to provide stability to the Y-shaped support 20.

The upper portion 50 of the left bracket 41 includes nipples 80 that extend outward from the inner surface of the upper portion 50 (see FIG. 4). The nipples 80 are designed to fit within openings 81 in the upper portion 51 of the right bracket 43 so that the left bracket 41 and the right bracket 43 are properly aligned before being fastened together. The location of the nipples 80 and the openings 81 could be reversed with respect to the left bracket 41 and the right bracket 43.

Once the left bracket 41 and the right bracket 43 are assembled together, the Y-shaped support 20 is attached to either the first cross-beam 30 or the second cross-beam 32. The process for assembling the Y-shaped support 20 to the cross-beam 32 is shown in FIGS. 5–7. The Y-shaped support 20 is secured to the first cross-beam 32 by extending fasteners 94 through the openings 90 in the left bracket 41 and openings 91 in the right bracket 43. The openings 90 are axially aligned with, and larger than, the openings 91 such that the heads of the fasteners fit within the larger openings 90. Recessing the heads of the fasteners 94 allows the first cross-beam 30 to be placed flush against the upper portion 50 of the left bracket 41 in order to assemble the first cross-beam 30 to the second cross-beam 32.

Alternatively, the first cross-beam 30 may be initially secured to the Y-shaped support instead of the second cross-beam 32. In this case, the fasteners 95 extend through openings 93 in the right bracket 43 and openings 92 in the left bracket 41 (shown only in FIGS. 5 and 6). The openings 93 in the right bracket 43 are axially aligned with, and larger than, the openings 92 in the left bracket 41 such that the heads of the fasteners 95 are recessed into the upper portion 51 of the right bracket 43. Recessing the heads of the fasteners in the right bracket 43 allows the second cross beam 32 to be placed flush against the upper portion 51 of the right bracket 43 in order to assemble the second cross-beam 32 to the first cross-beam 30.

The first cross-beam 30 and the second cross-beam 32 are secured to each other and the Y-shaped support 20 by using fasteners 34 which extend through axially aligned openings 99 in the upper portion 50 of the left bracket 51 and the upper portion 51 of the right bracket 43.

Various features and advantages of the present invention are set forth in the following claims.

I claim:
1. A playstation comprising:
   a Y-shaped support including,
      a top section having a left side and a right side,
      a lower left section extending downward from the top section,
      a lower right section extending downward from the top section,
   a first cross-beam secured against the left side of the top section, a second cross-beam secured against the right side of the top section, the second cross-beam being substantially parallel to the first cross-beam, a left leg secured to the lower left section of the Y-shaped support, and a right leg secured to the lower right section of the Y-shaped support.

2. The playstation according to claim 1 wherein the first cross-beam includes a first end and a second end and the second cross-beam includes a first end and a second end, the Y-shaped support being positioned at the first end of the first cross-beam and the first end of the second cross-beam.

3. The playstation according to claim 2 further comprising a support structure secured to the second end of the first cross-beam and the second end of the second cross-beam.

4. The playstation according to claim 1 wherein the Y-shaped support is assembled from a left bracket and a right bracket.

5. The playstation according to claim 4 wherein the left bracket includes an upper portion and a lower portion, and the right bracket includes an upper portion and a lower portion, the upper portion of the left bracket and the upper portion of the right bracket being secured together to form the top section of the Y-shaped support such that the lower portion of the left bracket becomes the lower left section of the Y-shaped support and the lower portion of the right bracket becomes the lower right section of the Y-shaped support.

6. The playstation according to claim 5 further comprising a first fastener for connecting the upper portion of the left bracket to the upper portion of the right bracket.

7. The playstation according to claim 6 further comprising a second fastener for securing the top section of the Y-shaped to support either the first cross-beam or the second cross-beam.

8. The playstation according to claim 7 wherein the upper portion of the left bracket and the upper portion of the right bracket each include a first opening, the first opening in the left bracket and the first opening in the right bracket are axially aligned and the first opening in the left bracket is larger than the first opening in the right bracket such that the second fastener extends through the left bracket and the right bracket in order to secure the first cross-beam to the right bracket, wherein the second fastener includes a head and the head of the second fastener becomes recessed within the larger first opening of the left bracket when the second fastener is used to secure the right bracket to the front crossbeam.

9. The playstation according to claim 8 wherein the upper portion of the left bracket and the upper portion of the right bracket each include a second opening, the second opening in the left bracket and the second opening in the right bracket are axially aligned and the second opening in the right bracket is larger than the second opening in the left bracket such that the second fastener extends through the second opening in the left bracket and the second opening in the right bracket in order to secure the second cross-beam to the left bracket, wherein the second fastener includes a head and the head of the second fastener becomes recessed within the larger second opening of the right bracket when the second fastener is used to secure the left bracket to the second cross-beam.

10. The playstation according to claim 6 further comprising a second fastener for securing the left bracket to the right bracket.

11. The playstation according to claim 10 wherein the first cross-beam and the second cross-beam are aligned against the first fastener and the second fastener.

12. The playstation according to claim 5 wherein the upper portion of either the left bracket or the right bracket includes an opening and the upper portion of the bracket that does not include the opening has an emboss, the emboss being adapted to fit within the opening when the upper portion of the left bracket is properly aligned against the upper portion of the right bracket.

13. The playstation according to claim 1 wherein the Y-shaped support includes an emboss that serves to align one of the cross-beams relative to the Y-shaped support when the cross-beam is placed against the emboss.

14. The playstation according to claim 1 wherein the Y-shaped support includes an emboss that serves to align one of the legs relative to the Y-shaped support when the leg is placed against the emboss.

15. The playstation according to claim 1 further comprising a center support extending between the left leg and the right leg.

* * * * *